(12) United States Patent
Schweigert

(10) Patent No.: US 7,072,160 B1
(45) Date of Patent: Jul. 4, 2006

(54) MONITORING DEVICE FOR POWER SUPPLIES

(75) Inventor: Harald Schweigert, Vienna (AT)

(73) Assignee: Siemens AG Osterreich, Vienna (AT)

( * ) Notice: Subject to any disclaimer, the term of this patent is extended or adjusted under 35 U.S.C. 154(b) by 229 days.

(21) Appl. No.: 10/148,616

(22) PCT Filed: Nov. 23, 2000

(86) PCT No.: PCT/AT00/00318

§ 371 (c)(1),
(2), (4) Date: Sep. 9, 2002

(87) PCT Pub. No.: WO01/41277

PCT Pub. Date: Jun. 7, 2001

(30) Foreign Application Priority Data

Dec. 1, 1999 (AT) .................................. 2023/99

(51) Int. Cl.
*H02H 3/18* (2006.01)

(52) U.S. Cl. ....................................................... 361/79

(58) Field of Classification Search ................ 361/93.1, 361/93.7, 93.9, 62, 63, 65, 66, 79, 83, 91.1, 361/100, 101; 307/9.1, 29, 30, 31, 38, 39
See application file for complete search history.

(56) References Cited

U.S. PATENT DOCUMENTS

| | | | | |
|---|---|---|---|---|
| 4,914,542 A | * | 4/1990 | Wagoner | 361/98 |
| 4,937,697 A | * | 6/1990 | Edwards et al. | 361/18 |
| 5,818,670 A | * | 10/1998 | Ahn | 361/18 |
| 6,157,089 A | * | 12/2000 | Xu | 307/9.1 |

FOREIGN PATENT DOCUMENTS

| | | |
|---|---|---|
| DE | 197 03 236 | 7/1998 |
| DE | 299 09 206 | 10/2000 |

* cited by examiner

*Primary Examiner*—Ronald Leja
(74) *Attorney, Agent, or Firm*—Ohlandt, Greeley, Ruggiero & Perle, L.L.P.

(57) ABSTRACT

A monitoring or watchdog unit (UWE) for a current or voltage supply system, wherein a supply voltage is taken across at least one cut-out safeguard to two or more outputs, the at-least one cut-out safeguard device configured as a controlled switch device and the watchdog unit providing a cut-out signal to the at-least one controlled switch device upon changes in a voltage or current exceeding a predetermined tolerance value.

4 Claims, 3 Drawing Sheets

MONITORING DEVICE FOR POWER SUPPLIES

BACKGROUND OF THE INVENTION

1. Field of the Invention

The invention pertains to a watchdog unit for current or voltage supply system, in which a supply voltage is furnished via at least one safety cutoff switch to two or more outputs.

2. Description of the Related Art

In industrial systems and in automated systems, e.g., a building's automation system, it is especially important that the supply voltages be furnished to the individual consumers or groups of consumers according to special safety criteria. In particular, information-processing parts of a control system, such as microprocessor components, must be supplied with the necessary energy as a priority in event of malfunction. In many industrial applications, the supply voltage is 24 volts dc voltage, although other dc voltage values are also customary and alternating voltages such as 115, 230 or 24 volts are also in use.

In event of short-circuit or overload in certain areas of a control system, such as the output peripherals, there can easily occur what is often only a brief total outage of the supply voltage of the control system, which often results in a loss of data in the central control units receiving the supply voltage.

When supply voltages are generated by main transformers connected to rectifiers, the safety cutoff switches used are line protection switches or as is also customary, melting fuses. The ability of transformers to briefly furnish a multiple of their rated current makes it possible to cut out a circuit with a short-circuit or an overload without triggering the safety features at the primary side. Although a transient voltage dip will occur, especially during short circuit, whose amplitude will depend on the stray inductance of the transformer and on the line impedances, proper dimensioning in most instances can prevent a so-called "crash" of central control units.

The increasing use of switching-mode power supplies, i.e., clocked power supply systems, makes this situation once again urgent, because of the sensitive electronics the internal control circuits limit the output current to values which lie only slightly above the rated current. In particular, the problem arises that the safeguards cannot shut off in sufficiently short time for the individual outputs. For quick shut-off, safeguards or power protection switches often require a multiple of their rated current. However, the switching-mode power supplies cannot furnish this in addition to the usual load, so that the entire supply voltage drops—even before a safeguard is triggered and the faulty output or branch is cut off. Such voltage dips associated with a hard-to-estimate magnitude can then lead to the already-mentioned crashing of central control units. If one wishes to preclude or greatly limit this danger, the only way to do this is to provide totally separate current supply devices for each individual circuit, such as peripheral subassemblies, on the one hand, and a CPU subassembly, on the other. But of course this solution is extremely costly in terms of expense and the required space and weight.

SUMMARY OF THE INVENTION

One object of the present invention is to provide a simple and economical manner of supplying several outputs for different branches based on a single supply voltage and thereby enable a selective, "intelligent" cut-off of individual branches in which short-circuits or overload occur.

This object is achieved with a watchdog unit of the kind mentioned in the beginning, wherein according to the invention the at least one safety cut-off switch is fashioned as a controlled switch, and the watchdog unit is designed to furnish a cut-off signal to at least one switch upon changes in currents or voltages beyond assigned tolerance values.

Due to the monitoring of voltage values which can be selected according to the application and an accordingly selective cut-off, an entirely flexible solution of the above-described problem is possible. In particular, it is possible to supply sensitive core areas of a system, such as CPU components, despite the occurrence of faults in other areas.

In one aspect of the present invention, it is specified that the watchdog unit is designed to compare the supply voltage against a reference voltage and to output a cut-off signal to at least one switch if the supply voltage drops by a given value. Voltage drops of the supply voltage are usually a certain sign of overload and can also be easily detected. It may be recommended, if the watchdog unit is so designed, to furnish cut-off signals to several switches, namely, to a first switch when the supply voltage drops by a given value, then to a second switch, and so on, but the switch-off processes will end when the supply voltage increases. In this way, the individual outputs can be switched off according to a given priority, namely, first those outputs which supply units not as important to the operation of a system, and then the output which supplies a CPU unit.

In another aspect of selective monitoring and cut-off, the watchdog unit is designed to compare the residual voltages existing at the controlled switches and to output a cut-off signal to switches whose residual voltage increases above a predetermined maximum value.

In another aspect of the present invention, the watchdog unit is designed to compare the output voltages occurring downstream from the controlled switches against reference voltages and to output a cut-off signal to switches whose corresponding output voltage drops below a predetermined value.

Furthermore, the supply voltage may be fed directly to an output. From such a non-safeguarded output, that component whose malfunction has the most perturbing effect is supplied.

In one embodiment of the present invention, a current sensor is assigned to at least one output and the watchdog unit is designed to monitor the signals furnished by the current sensor and to open the corresponding controlled switch when predetermined limit values of the current are exceeded at one output.

In another aspect hereof, the watchdog unit is designed to open the corresponding switch with a time delay. The time delay to be dependent on the amount by which a rated current is exceeded.

For critical applications, the watchdog unit can compare the supply voltage against a reference voltage and open the controlled switch in a branch leading to an output if the supply voltage has dropped below a predetermined limit value and the current in this branch has exceeded a predetermined limit value.

If the current sensors are adjustable resistors, the user can easily set a rated current for each output in adaptation to the load actually existing at said output.

The stated object is also solved with a current supply device which possesses a watchdog unit in the sense of one or more of the above-given features.

The above and other objects, advantages, and benefits of the present invention will be understood by reference to following detailed description and appended sheets of drawings.

The above and other objects, advantages, and benefits of the present invention will be understood by reference to following detailed description and appended sheets of drawings.

DETAILED DESCRIPTION OF THE DRAWINGS

Figure 1:
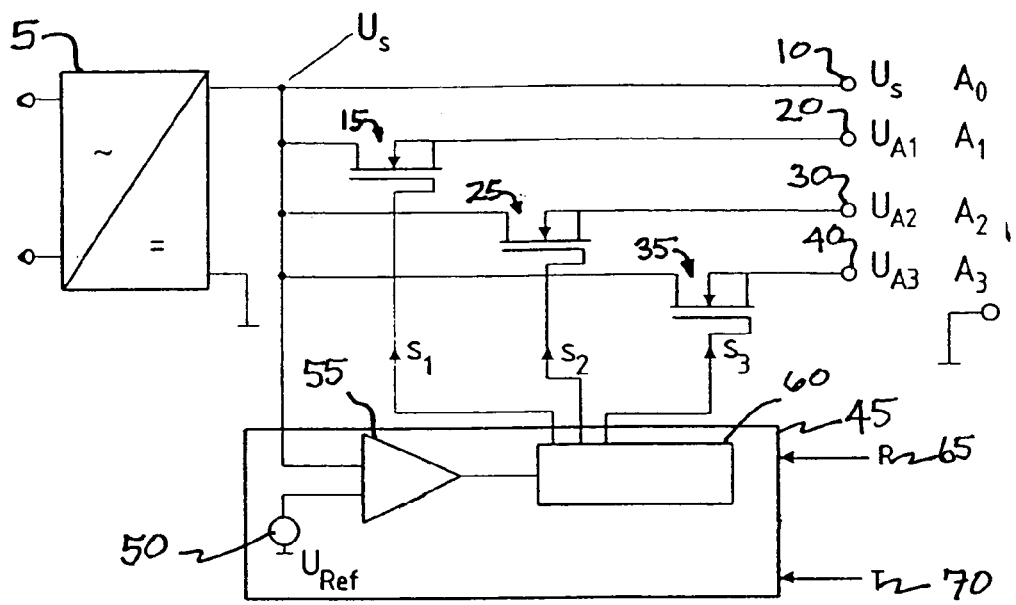
FIG. 1 shows a simplified block diagram of a first embodiment of the invention.

According to FIG. 1, a clocked voltage converter SPW 5 furnishes an output or supply voltage $U_S$, for example, 24 volts, against ground. Such voltage converters or switching-mode power supplies should be familiar to the practitioner in a multitude of designs and do not in themselves constitute the subject of the invention. For example, an input alternating voltage, such as 230 volts, is rectified and the resulting dc voltage is taken to a primary winding of a transformer across a clocked switch. At the secondary side, another rectification to form the supply voltage occurs. The voltage converter SPW 5 works, for example, as a reverse or flux converter and may be regulated to output constant output voltage. However, it should be emphasized that the invention is not limited to particular converters and that the supply voltage can also be, for example, a regulated or non-regulated alternating voltage.

The supply voltage $U_S$ is taken directly to a first output $A_0$ (10), but is also connected to an additional three outputs $A_1$, (20) $A_2$ (30) and $A_3$ (40) via controlled switches SW1 (15), SW2 (25), and SW3 (35), respectively that are actuated by a watchdog unit UWE.45 The switches SW1(15) . . . SW3(35) are preferably low-impedance semiconductor switches, such as MOSFETs, bipolar transistors or switchable thyristors, although the use of electromechanical switches such as relays and transducers are not be precluded. The voltages $U_S$, $U_{A1}$, $U_{A2}$, $U_{A3}$ at the outputs $A_0$ (20) . . . $A_3$ (40) are practically identical in normal operation, except for the residual voltage at the switches SW1(15) . . . SW3(35).

Figure 5:
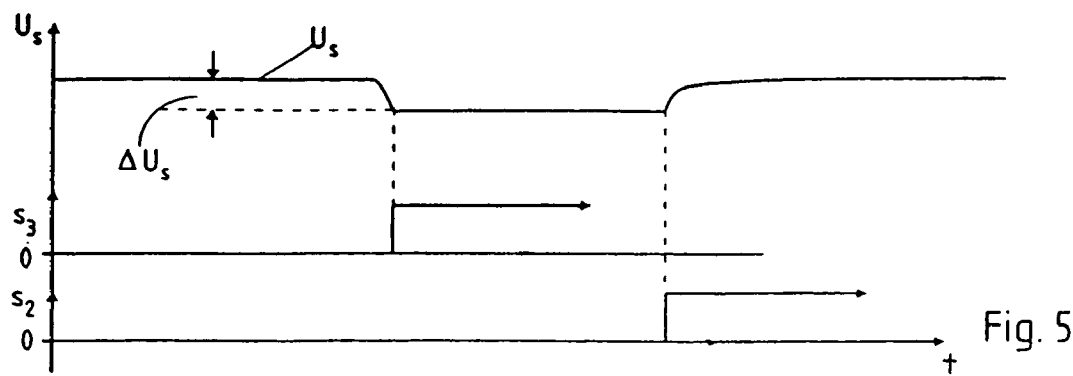
FIG. 5 shows the switching off of outputs in a diagram for an embodiment according to FIG. 1.

In the watchdog unit UWE 45, the supply voltage $U_S$ or a part of this voltage is compared to a reference voltage $U_{Ref}$, for which a comparator KOM 55 can be used. If the supply voltage $U_S$ drops by a predetermined value, $\Delta U_S$, the comparator KOM 55 outputs a signal to a secondary control FST 60 that sends a switching signal $s_3$ to the first controlled switch SW3(35) and opens it, as can be seen from FIG. 5. If the supply voltage $U_S$ does not subsequently increase, the second controlled switch SW2 (25) is also opened via the comparator KOM 55 and the secondary control FST 60, so that now voltages occur only at the outputs $A_0$(10) and $A_1$(20). Note, the switch SW1 might also be opened. But if the supply voltage rises again after a cut-out process, such as the second one depicted here, the watchdog unit terminates further cut-off processes.

FIG. 1 also shows that an external reset signal $R_T$(65) can be delivered to the watchdog unit UWE 45, which closes the switches which were opened. Furthermore, an outside disconnect signal $S_T$(70) can be delivered to the watchdog unit, which enables a switching off of all or some outputs independant of load or short-circuit conditions.

Figure 2:
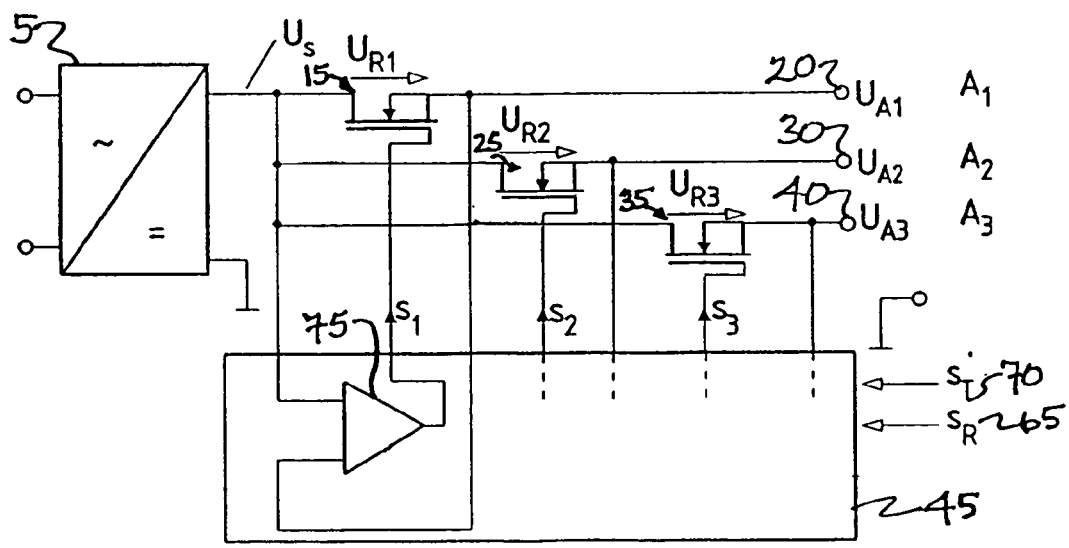
FIG. 2 shows a second embodiment of the invention in a similar representation to FIG. 1.

In the embodiment shown by FIG. 2, it is not the supply voltage $U_S$ which is monitored, but instead there is a monitoring of the residual voltages $U_{R1}$, $U_{R2}$, $U_{R3}$ of the controlled switches SW1(15), SW2(25), and SW3(35). The embodiment depicted here has three outputs $A_1$ (20), $A_2$(30), and $A_3$ (40) but no output going directly to the supply voltage $U_S$. Such an output, similar to output $A_0$ of FIG. 1 may also be included in the embodiment of FIG. 2. The embodiment of FIG. 2 is applicable especially for semiconductor switches, since precisely defined residual voltages occur there. The watchdog unit UWE 45 is implemented to open the corresponding controlled switches, such as SW2 (25), when a residual voltage, such as the residual voltage $U_{R2}$ according to FIG. 6, increases up to or beyond a predetermined maximum value $U_{R2max}$.

FIG. 2 indicates, for example, a switching amplifier SV1(75), which furnishes a switching signal $s_1$ to the switch SW1(15) when its input voltage exceeds the value $U_{R2max}$. Of course, other solutions are also available, e.g., comparing residual voltages against reference voltages in comparators, etc.

Figure 6:
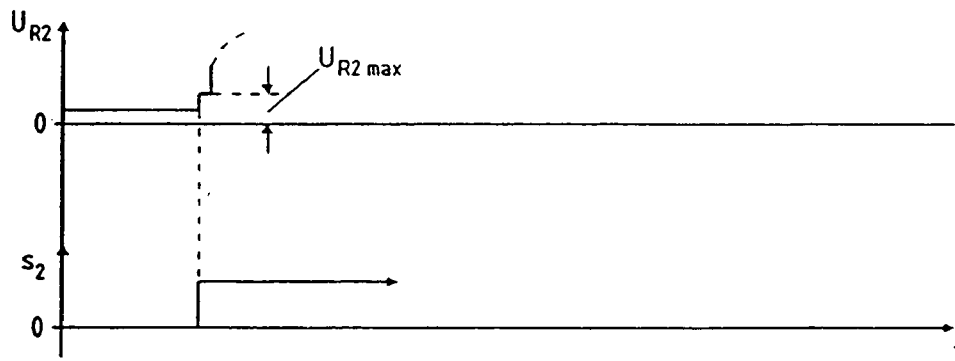
FIG. 6 shows a similar diagram, referring to FIG. 2.

As can be seen from the diagram of FIG. 6, when the rated load occurs at the output $A_2$, a slight residual voltage $U_{R2}$, say, 20 mV, occurs at the controlled switch SW2(25). When overload occurs, this residual voltage increases and if it exceeds the value of, say, 40 mV, the watchdog unit UWE (45) opens the switch SW2(25)—the "residual voltage" then naturally jumps to the value $V_S$, which is merely suggested in FIG. 6. Also in this embodiment, reset signals $S_R$(65) or disconnect signals $S_T$(70) can be delivered to the watchdog unit UWE(45).

In contrast to the embodiment according to FIG. 1, in the circuit according to FIG. 2 (and also in the yet to be discussed FIG. 4) the only outputs switched off are those at which an overload or a short-circuit occurs.

Figure 3:
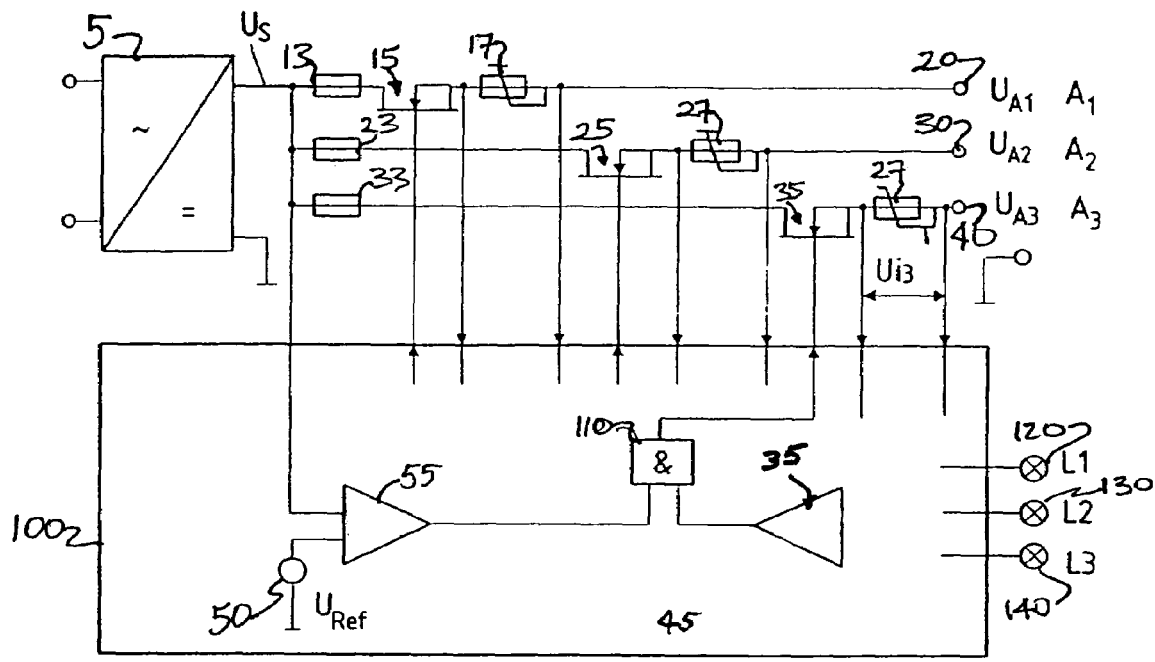
FIG. 3 shows a third embodiment of the invention in a similar representation to FIGS. 1 and 2.

In the embodiment according to FIG. 3, the voltages $U_{i1}$, $U_{i2}$, $U_{i3}$ are monitored at three measuring resistors $R_{M1}$(17), $R_{M2}$(27), and $R_{M3}$(37) which are in series with each output $A_1$(15), $A_2$(25), and $A_3$(35) with a safeguard Si1(13), Si2 (23), and Si3(33) (e.g., melting fuses or automatic safeguards) as well as controlled switches SW1(15), SW2(25), and SW3(35). In theory, this circuit corresponds to that of FIG. 2, but here resistors, in particular variable resistors are used to measure the current.

The voltages $U_{A1}$, $U_{A2}$, $U_{A3}$ corresponding to the currents at the three outputs $A_1$, $A_2$, $A_3$ can be taken, in turn, to switching amplifiers SV1, SV2, SV3, for example, in order to enable a switching off of the corresponding controlled switches under excess current. The measuring resistors $R_{M1}$(17), $R_{M2}$ (27), and $R_{M3}$(37) can be set by the user to the particular rated current desired.

Figure 7:
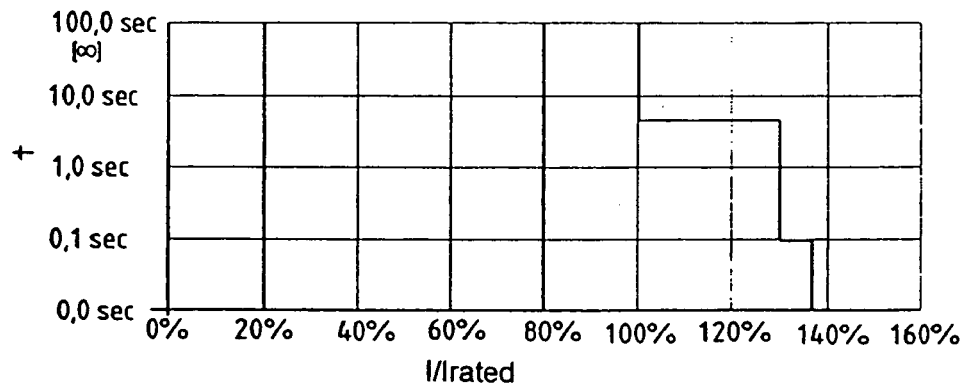
FIG. 7 shows the time-delayed switching off of an output in a diagram.

According to this example of embodiment, the present invention provides for time constants for the opening of the controlled switches as a function of the overrange of the rated current, for which also see FIG. 7. When the current at one of the outputs reaches 100% of the rated current set for an adjustable measuring resistor, a time element is started, which, for example according to FIG. 7, opens the particular controlled switch only after five seconds. If within this time of five seconds the current falls back, however, no triggering occurs.

If the current at one of the outputs reaches a value of, say, 130% of the rated current, as shown in FIG. 7, then an automatic control circuit 100 (generally depicted in FIG. 3) can ensure that the current is limited to this value, while at the same time a second timing element can be started to make sure that the corresponding controlled switch is opened after a substantially shorter time than in the previously described case, for example, after 0.1 second according to FIG. 7.

In an aspect of the present invention, that the voltage converter SPW 5 furnishes a constant output voltage up to a certain maximum current, but lowers the output voltage as the current continues to rise. According to this aspect, when such a drop in the supply voltage $U_S$ occurs, which can be determined as shown in FIG. 3 (e.g., a comparator KOM 55 and a reference voltage $U_{Ref}$(50)) and if the rated current is at the same time exceeded at one of the outputs $A_1(20)$ . . . $A_3(40)$, an opening of the controlled switch in the respective output branch occurs in order to avoid a collapse of the entire system. In FIG. 3, this relationship is implemented by a logical "AND" operator represented generally by schematic block 110.

For sake of clarity and not as a limitation, FIG. 3 depicts the monitoring of the output $A_3$. Of course, the other outputs $A_1(20)$ and $A_3(40)$ are likewise monitored, and in practice the number of monitored points may exceed three. As shown in FIG. 3, the opening of the controlled switches can be indicated for one of the three outputs by indicators, such as for example, lamps L1 (120), L2 (130), L3 (140).

Although the discussed timing elements are not explicitly shown in FIG. 3, the various applicable devices and methods for implementing time and current-dependent triggering schemes will be appreciated by those skilled in the art. For example, the timing elements may be contained in comparators or switching amplifiers, having a digital or an analog implementation.

Figure 4:
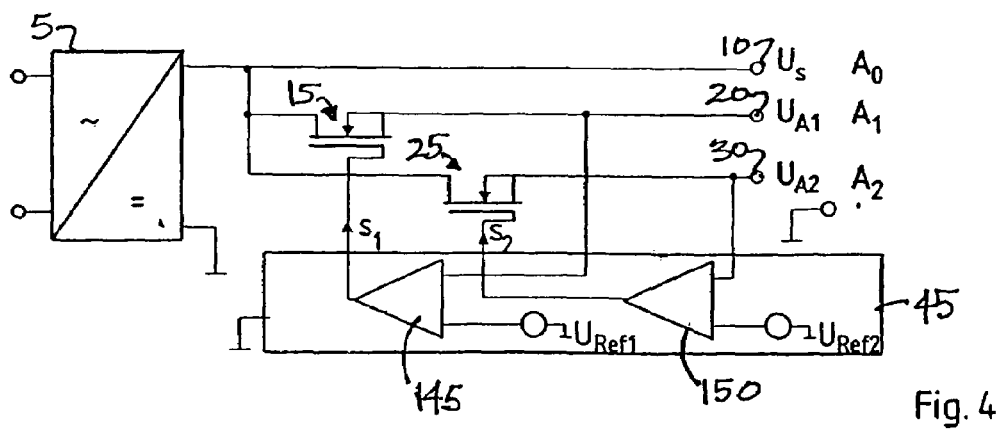
FIG. 4 shows a fourth embodiment of the invention in a similar representation to FIGS. 1 and 2.

In the circuit according to FIG. 4, there is a monitoring of individual output voltages. More precisely, the circuit has a non-safeguarded, direct output $A_0$ (10) with the supply voltage $U_S$ and two outputs $A_1(20)$, $A_2(30)$ that are connected to the supply voltage $U_S$ and controlled switches SW1(15), SW2 (25), respectively, and furnish output voltages $U_{A1}$, $U_{A2}$.

Figure 8:
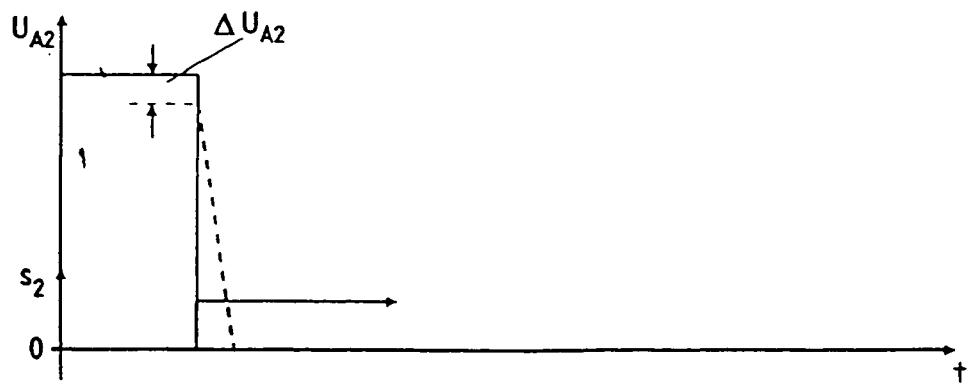
FIG. 8 shows a similar diagram referring to FIG. 3.

In the circuit according to FIG. 4, each of the two output voltages $U_{A1}$, $U_{A2}$ is monitored, for which there are two comparators K01(145), K02 (150) provided, respectively, for example, in the watchdog unit UWE 45 for comparison against reference voltages $U_{Ref1}$, $U_{Ref2}$. For example, if the voltage $U_{A2}$ at output $A_2$ (30) drops by a predetermined value $\Delta U_{A2}$, the comparator K02(150) will switch through and open the controlled switch SW2(25), see FIG. 8. Here, there is an individual switching off of the individual outputs $A_1(20)$ and $A_2(30)$.

Note that in the exemplary embodiment of FIG. 2 a current measurement is the primary cut-off criterion, while the embodiments according to FIG. 1 and FIG. 4 a voltage measurement or monitoring is foremost.

When using the invention, it should be noted that, for example, the overwhelming majority of short-circuits or overloads which occur originate in output areas, i.e., components which require the supply voltage in order to activate lamps, gates, relays, motors, etc., whereas input areas, which are components that detect conditions of a layout or a system, as well as microprocessor components, are very seldom the cause of short-circuit or overload. Depending on the layout being energized, the protection priorities, and the supply voltage used, the present invention is applicable to a wide variety of systems, contexts, and environments. It should be noted that the voltages being monitored may occur not only at measuring resistors, but also for example at inductances and, for example, the circuits can be easily modified so that a positive (for example) output voltage is possible with several ground connections safeguarded according to the invention. Thus, it should be understood that the foregoing description is only illustrative of a present implementation of the teachings herein. Various alternatives and modification may be devised by those skilled in the art without departing from the invention. Accordingly, the present invention is intended to embrace all such alternatives, modifications, and variances that fall within the scope of the appended claims.

What is claimed is:

1. A monitoring system for power supplies, comprising:
a supply voltage supplied via at least one controlled switch to two or more outputs; and
a monitoring unit,
wherein said monitoring unit compares said supply voltage with a reference voltage, and compares a current flowing across said at least one controlled switch with at least one nominal current value,
wherein if said current flowing across said at least one switch exceeds a first nominal value, said monitoring unit sends a cut-off signal to said at least one controlled switch after a first delay time, and
wherein if, in addition to said current exceeding said first nominal value, said supply voltage drops by a predetermined tolerance value below said reference voltage, said monitoring unit sends said cut-off signal to said at least one controlled switch without delay.

2. The monitoring system according to claim 1, wherein said monitoring unit compares said current flowing across said at least one controlled switch with said first nominal current value and with a second nominal current value, the second value being greater than the first value, and
if said current reaches said second nominal value, said monitoring unit limits said current at said second nominal value and sends said cut-off signal to said at least one controlled switch after a second delay time, said second delay time being shorter than said first delay time.

3. The monitoring system according to claim 1, wherein said monitoring unit:
detects residual voltages at said at least one controlled switch as an indicator for said current flowing across each of said at least one controlled switch,
compares said residual voltages, and
if said residual voltage at said at least one controlled switch increases above a predetermined maximum value, said system sends said cut-off signal to said at least one controlled switch after said first delay time.

4. The monitoring system according to claim 1, further comprising current sensors for detecting said current flowing across said at least one controlled switch, the current sensors being adjustable resistors.

* * * * *